ROGERS & SELBY.
Fruit Drier.
No. 91,671.
Patented June 22, 1869.
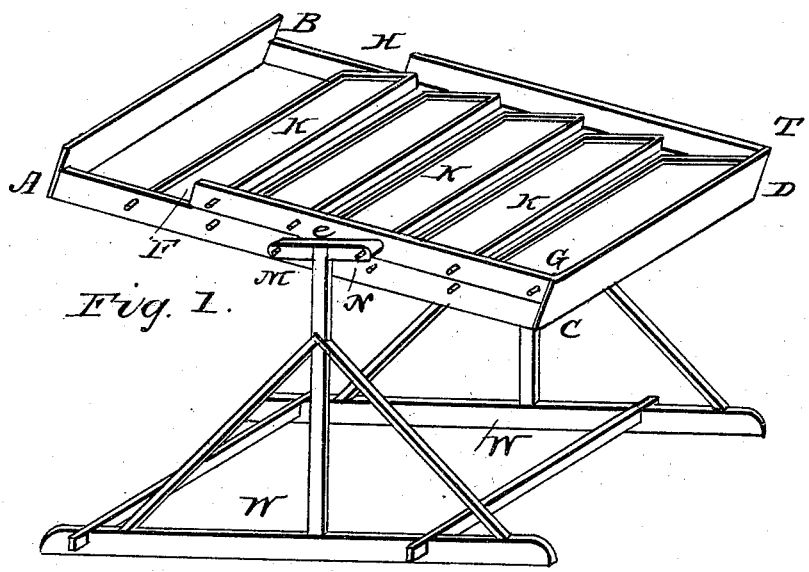
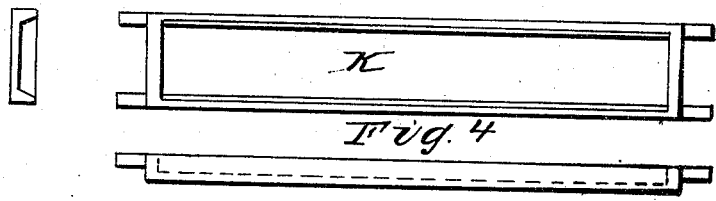
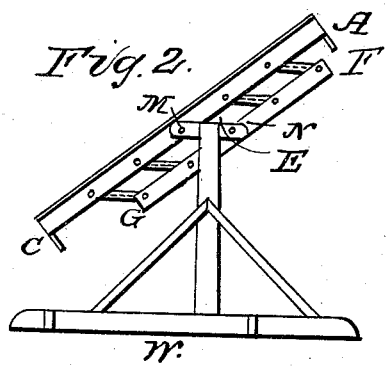
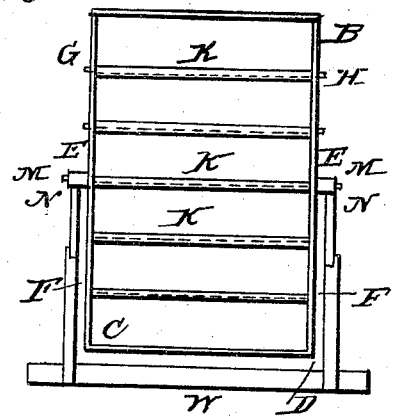
witnesses
Benj. S. Dalrymple
Wm. H. Bradston
Inventor
Samuel D Rogers
Frances E. Selby

United States Patent Office.

SAMUEL D. ROGERS, AND FRANCIS C. SELBY, OF ALLEGAN, MICHIGAN.

Letters Patent No 91,671, dated June 22, 1869.

IMPROVEMENT IN FRUIT-DRIERS.

The Schedule referred to in these Letters Patent and making part of the same.

Be it known that we, SAMUEL D. ROGERS and FRANCIS C. SELBY, of Allegan, county of Allegan, State of Michigan, have invented a new and useful Apparatus for Drying Fruit; and we do hereby declare that the following is a full, clear, and exact description of the construction and use of the same, reference being had to the annexed drawings, making a part of this specification, in which—

Figure I is a perspective view.
Figure II, a side elevation.
Figure III, a front elevation, in a position different from that in Fig. II.

The apparatus consists in the supports W, ending at the top with the cross-pieces E, to which is fastened, by means of four pins, M N M N, the shelf K.

A space being left on the pins M M, between the inner side of the supports, and the extremities of the shelf K, a frame, A C D B, is allowed to swing around them.

In the same manner, another frame, F G T H, swings around N N.

The first-mentioned frame is closed, so as to form a case closed on five sides.

Both of these frames are provided with a system of holes, in such a manner that the distance between the holes of the frame A C D B, and the points M M, is equal to that between the holes of the frame F G T H, and the points N N. These holes receive the shelves K, as shown in Fig. II, which are, for this purpose, furnished with cylindrical pins on the four corners.

A single shelf is represented in Figure IV.

All these shelves, the number of which may be varied according to circumstances, being equally wide, a parallelogram is formed by any two shelves, and those parts of the frames included between their extremities M N O P, Figs. I and II, are such a parallelogram. These parallelograms will not be destroyed, however far the two frames may swing around their respective axles M M and N N. Consequently, since the directions of M N and M N are always horizontal, all the shelves will maintain a horizontal position, whatever angle the frames may form with the horizon.

From this arrangement a double advantage arises:

First, the fruit put on the shelves for drying, may be protected from getting wet in a shower, by simply turning over the whole movable part of the apparatus, so as to bring the bottom of the frame to the top. Fig. II shows the apparatus in such a position.

Secondly, the frames being brought to a vertical position, the shelves will form a kind of cupboard, which may be used for keeping fruit in winter. (See Fig. III.)

The apparatus, as shown in the accompanying drawings, is made entirely of wood, but other material may be used, and especially the bottom of the shelves may be made of sieves, so as to permit the air to surround the fruit from all sides.

What we claim as our invention, and desire to secure by Letters Patent, is—

The combination of an apparatus for drying fruit, consisting of a number of shelves which are combined to a system, in such a way that they always remain in a horizontal position, although they may change their relative position to each other.

SAMUEL D. ROGERS.
FRANCIS C. SELBY.

Witnesses:
BENJ. S. DALRYMPLE,
WM. H. BRADSHAW.